United States Patent
Light-Holets et al.

(10) Patent No.: US 11,067,015 B2
(45) Date of Patent: Jul. 20, 2021

(54) SYSTEMS AND METHODS FOR CYLINDER DEACTIVATION OPERATION IN RESPONSE TO ROUTE CONDITIONS

(71) Applicant: Cummins Inc., Columbus, IN (US)

(72) Inventors: Jennifer Kay Light-Holets, Columbus, IN (US); Govindarajan Kothandaraman, Columbus, IN (US); J. Steven Kolhouse, Columbus, IN (US); Vivek Anand Sujan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/822,407

(22) Filed: Mar. 18, 2020

(65) Prior Publication Data

US 2020/0378324 A1     Dec. 3, 2020

Related U.S. Application Data (60) Provisional application No. 62/855,110, filed on May 31, 2019.

(51) Int. Cl.
| | | |
|---|---|---|
| *F02D 13/06* | (2006.01) | |
| *F02D 41/02* | (2006.01) | |
| *F02D 41/00* | (2006.01) | |

(52) U.S. Cl.
CPC ......... *F02D 41/0087* (2013.01); *F02D 13/06* (2013.01); *F02D 41/0235* (2013.01); *F02D 2200/0802* (2013.01); *F02D 2200/501* (2013.01); *F02D 2200/701* (2013.01); *F02D 2200/702* (2013.01)

(58) Field of Classification Search
CPC ............. F02D 41/0087; F02D 41/0235; F02D 41/123; F02D 13/06; F02D 2200/0802; F02D 2200/501; F02D 2200/701; F02D 2200/702
USPC ........................................................ 123/481
See application file for complete search history.

(56) References Cited

U.S. PATENT DOCUMENTS

| | | | |
|---|---|---|---|
| 7,103,468 B2 | 9/2006 | Wakashiro et al. | |
| 8,095,209 B2 | 1/2012 | Smyth et al. | |
| 8,401,733 B2 | 3/2013 | Weslati et al. | |
| 9,162,679 B2 | 10/2015 | Sujan et al. | |
| 9,846,049 B2 | 12/2017 | Krumm | |
| 2012/0158231 A1* | 6/2012 | Steuernagel | F02N 11/0837 701/22 |
| 2015/0330500 A1* | 11/2015 | Sujan | F16H 61/0213 701/55 |
| 2015/0354477 A1* | 12/2015 | Leone | F02D 41/0065 123/406.26 |
| 2017/0356371 A1 | 12/2017 | Rollinger et al. | |
| 2018/0100459 A1* | 4/2018 | Dickson | F02D 41/0087 |

(Continued)

FOREIGN PATENT DOCUMENTS

WO     2017023898     2/2017

*Primary Examiner* — Mahmoud Gimie
(74) *Attorney, Agent, or Firm* — Taft Stettinius & Hollister LLP (57) ABSTRACT

Systems, apparatus, and methods are disclosed that include a divided exhaust engine with at least one primary exhaust gas recirculation (EGR) cylinder and a plurality of non-primary EGR cylinders. The systems, apparatus and methods control the EGR fraction by deactivation of one or more of the cylinders.

22 Claims, 6 Drawing Sheets

(56) References Cited

U.S. PATENT DOCUMENTS

2018/0105158 A1    4/2018  Namuduri et al.
2019/0277206 A1*  9/2019  McCarthy, Jr. ......... F02D 13/06

* cited by examiner

SYSTEMS AND METHODS FOR CYLINDER DEACTIVATION OPERATION IN RESPONSE TO ROUTE CONDITIONS

CROSS-REFERENCE TO RELATED APPLICATION

The present application claims the benefit of the filing date of US Provisional Application Ser. No. 62/855,110 filed on May 31, 2019, which is incorporated herein by reference.

FIELD OF INVENTION

This invention relates to an internal combustion engine with multiple cylinders, and more particularly to controlling cylinder deactivation operation of one or more of the multiple cylinders in response to one or more route conditions.

BACKGROUND

The cylinders in an internal combustion engine can be disabled in order to reduce fuel consumption. This may be accomplished by cutting off the supply of fuel to selected cylinders, particularly to save fuel under light engine load conditions. This increases the load on the other cylinders and provides some pumping loss reduction, but still requires pumping work to move the air flow through all the cylinders. Another method of cylinder disablement includes disabling or maintaining the intake and exhaust valves of the cylinder in a closed condition, which further reduces pumping work over simply providing a fuel cutoff to the deactivated cylinders.

Entering and exiting a cylinder deactivation mode of operation is typically controlled based on the engine load. However, cylinder deactivation under other operating conditions may also be beneficial. Therefore, further improvements in cylinder deactivation operations are needed.

SUMMARY

The present disclosure includes unique systems, methods, and apparatuses for a cylinder deactivation in response to one or more route conditions. For example, the cylinder deactivation mode of operation can be initiated in response to one or more present and/or upcoming route conditions. The route condition(s) can include, for example, real time traffic information, route grade, route layout, road conditions, and/or data provided by vehicle-to-vehicle (V2V)/vehicle-to-X (V2X) communications.

The cylinder deactivation results in the closing of the intake and/or exhaust valves of the one or more deactivated cylinder(s) and/or the cutting off of fuel flow (and spark energy for spark ignited engines) to the one or more deactivated cylinders of the engine in response to one or more route conditions. In certain embodiments, an available torque reserve from a transmission gear shift and/or an electric motor and/or an engine can be considered along with the route grade in whether to enter the cylinder deactivation mode of operation and/or to extend the cylinder deactivation mode of operation.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
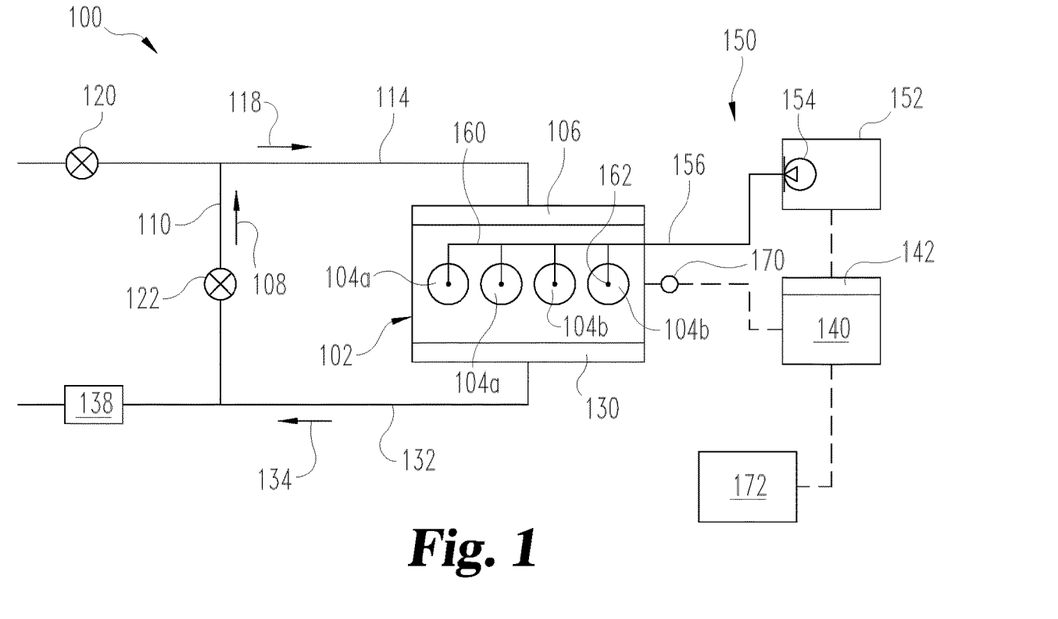
FIG. 1 is a schematic depiction of a system having an internal combustion engine operable in a cylinder deactivation mode of operation.

Referencing FIG. 1, a vehicle system 100 is depicted having powertrain that includes an internal combustion engine 102 operable to power a drivetrain to propel a vehicle along a route. The engine 102 is an internal combustion engine of any type, and can include a stoichiometric engine, a diesel engine, a gasoline engine, an ethanol engine, and/or a natural gas engine. In certain embodiments, the engine 102 includes a lean combustion engine such as a lean burn gasoline engine, or a diesel cycle engine. The engine 102 includes a number of cylinders 104a, 104b (which may also be referred to individually or collectively as cylinders 104.) The number of cylinders 104 may be any number suitable for an engine. In the illustrated embodiment of FIG. 1, the system 100 includes an engine 102 having an inline 4 cylinder arrangement for illustration purposes, but V-shaped cylinder arrangements and other numbers of cylinders are also contemplated.

The engine 102 includes nominal cylinders 104a which are operated with a nominal valve lift profile under both nominal and cylinder deactivation (CDA) operating conditions, and one or more deactivation cylinders 104b which are operated with a deactivation valve lift profile in response to cylinder deactivation conditions being present. The deactivation cylinders 104b can be operated with the nominal valve lift profile when the cylinder deactivation mode of operation is not active. In the illustrated embodiment of FIG. 1, two cylinders of engine 102 are deactivation cylinders 104b, but more or fewer than two cylinders can be deactivation cylinders. In addition, the cylinders identified as nominal and deactivation cylinders in FIG. 1 can be any of the cylinders 104 and in any order.

Figure 2:
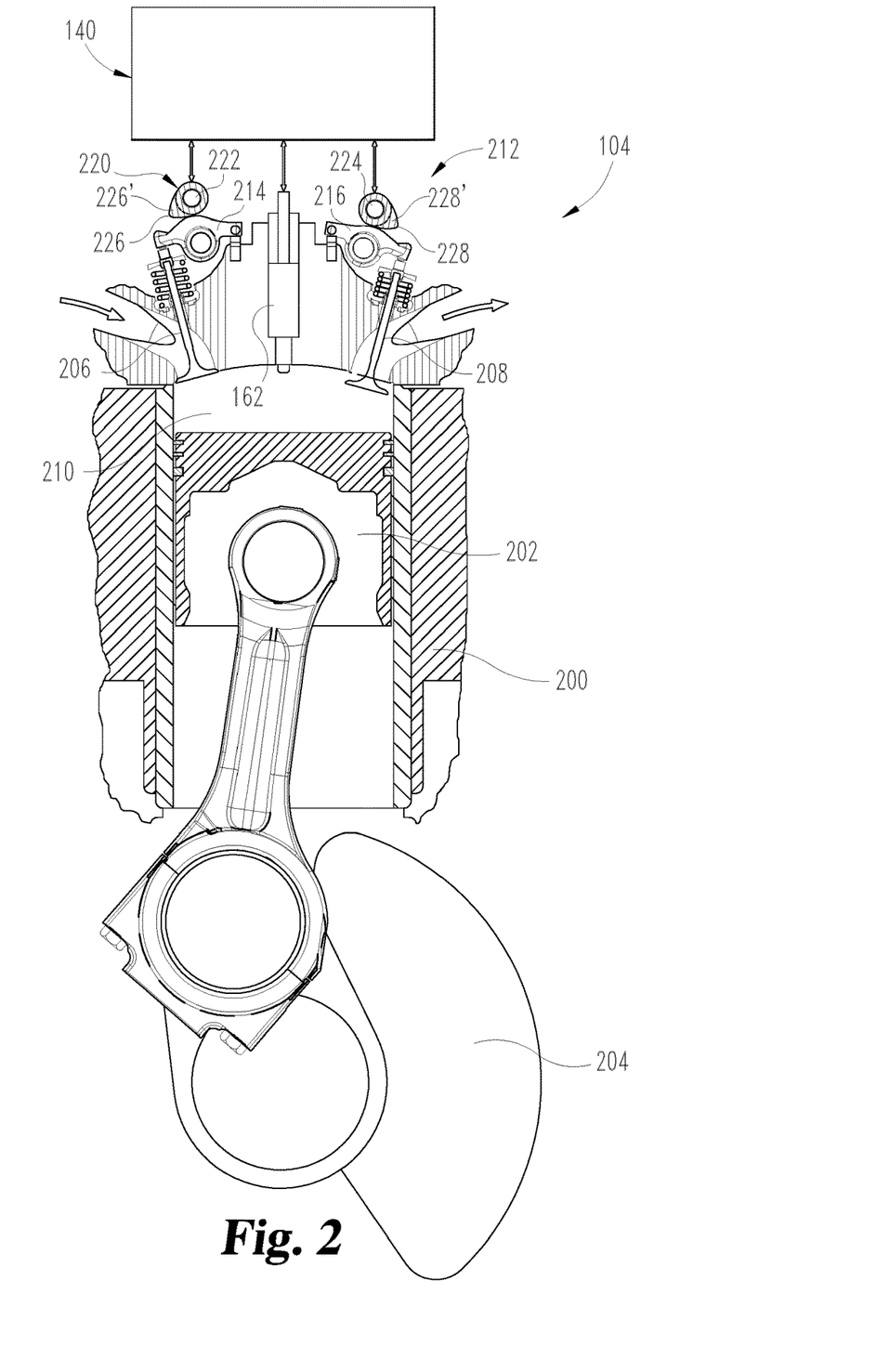
FIG. 2 is a schematic depiction of one embodiment of a cylinder of the internal combustion engine of FIG. 1 or FIG. 3.

A typical multi-cylinder engine 102 has an engine block 200 with multiple cylinders 104, and, as shown in FIG. 2, a piston 202 in each cylinder that is operably attached to a crankshaft 204. There is also at least one intake valve 206 and at least one exhaust valve 208 that allow passage of air into and out of each cylinder 104. A combustion chamber 210 is formed inside each cylinder 104. The typical engine 102 operates on a four-stroke cycle that sequentially includes an air intake stroke, a compression stroke, a power stroke, and an exhaust stroke. As used herein, one cycle of the cylinder or engine occurs at the completion of these four strokes.

When cylinders are deactivated, the opening mechanism of prior art valve actuation mechanisms is collapsed so the intake and exhaust valves of the deactivated cylinders remain in a completely closed condition during cylinder deactivation. In addition, fuel delivery to the deactivated cylinders is stopped. The active cylinders are then operated with a greater amount of air and fuel to meet the engine power demands. The active cylinders thus operate with a greater air flow, reducing pumping losses, and improved fuel efficiency.

The present system 100 may include any suitable valve actuation mechanism for controlling the opening and closing of the intake valves 206 and exhaust valves 208. In the illustrated embodiment, an example valve actuation mechanism 220 is shown that is configured to provide a first non-zero lift profile for opening and closing intake valve 206 of each cylinder 104 in response to nominal engine operation conditions. The exhaust valve(s) of each cylinder can also be opened and closed with a non-zero valve lift profile that is the same or different from that of the non-zero-valve lift profile that opens and closes the intake valves 206. As shown in FIG. 2, valve actuation mechanism 220 is further configured for switching to a second non-zero valve lift profile for operation of intake valves 206 of deactivation cylinders 104*b* in response to a cylinder deactivation condition where cylinders 104*b* are deactivated. The exhaust valves 208 of deactivation cylinders 104*b* are operated with a zero lift profile in response to cylinder deactivation conditions. As discussed further below, a cylinder deactivation condition can be determined in response to one or more route conditions of the vehicle, such as a traffic conditions indicating a low speed for the vehicle is imminent or required.

Valve actuation mechanism 220 includes hardware mounted in a head 212 of engine 102 and control algorithms that are internal to the controller 140. The cylinder deactivation hardware includes a valve opening mechanism 214, 216 for respective ones of intake and exhaust valves 206, 208 of each cylinder 104. The valve actuation mechanism 220 also comprises a hydraulic subsystem (not shown) that supplies pressurized oil from an engine oil pump (not shown) to each valve opening mechanism 214, 216. In one embodiment, the valve opening mechanism 214, 216 is comprised of a lifter and a locking pin mechanism that is inserted between the camshaft 222, 224 and the respective valves 206, 208.

A typical valve train is comprised of the camshafts 222, 224, or in another embodiment a single camshaft. The plurality of valves 206, 208 are normally closed to a zero lift position against their respective valve seats and are spring-mounted in the head 212. The valve train is operable to open the plurality of exhaust valves 208, the plurality of intake valves 206, or both, depending upon the engine design. Each camshaft 222, 224 is a long rod that is mounted in the engine 102 and rotates around its longitudinal axis. Each camshaft 222, 224 has cam lobes 226, 228, respectively, that correspond to and operate each valve 206, 208. Cam lobes 226, 228 are typically cut into the respective camshaft 222, 224 such that they are eccentric to the axis of rotation of the respective camshaft 222, 224.

Each lobe 226, 228 has an eccentric portion and a portion that is concentric to the longitudinal axis of the cam shaft. The concentric portion is defined by and can be referred to as the cam base circle, and the eccentric portion projects from the base circle to define a non-zero-lift profile to open and close the respective valve 206, 208 for a specified lift and duration from its valve seat. Each lobe 226, 228 is in physical contact with a respective one of the valve opening mechanisms 214, 216, which are each comprised of a lifter and a locking pin mechanism. The valve opening mechanisms 214, 216 are in physical contact with a respective one of the valves 206, 208.

The rotation of the camshaft 222, 224 causes respective valve 206, 208 to open according to the non-zero lift profile defined by the corresponding lobe 226, 228 when the position of the respective camshaft 222, 224 is such that the eccentric portion of its corresponding lobe 226, 228 is in contact with the adjacent valve opening mechanism 214, 216. For deactivation cylinders 104*b*, such as shown in FIG. 1, the valve actuation mechanism 220 is operable to disable each intake valve 206, disable each exhaust valve 208, and disable each fuel injector 162 for each cylinder 104*b* that is to be deactivated in response to a cylinder deactivation condition. For example, the camshafts 222, 224 can be switchable to place a second cam lobe that defines a cam base circle/zero lift profile 226', 228' that maintains the respective intake valve 206 and exhaust valve 208 at each deactivation cylinder 104*b* in a closed position against its valve seat in response to cylinder deactivation conditions.

Referring back to FIG. 1, in the system 100 exhaust flow 134 produced by cylinders 104 is provided to an exhaust manifold 130 and outlet to an exhaust passage 132. In other embodiments, a turbine (not shown) in exhaust passage 132 is provided that is operable via the exhaust gases to drive a compressor (not shown) in intake passage 114.

System 100 may include an exhaust gas recirculation (EGR) passage 110 to provide an EGR flow 108 that combines with an intake flow 118 at a position upstream of an intake manifold 106. An EGR system is optional and non-limiting. Intake manifold 106 provides a charge flow including the intake flow 118 and, if provided, with EGR flow 108 to cylinders 104. Intake manifold 106 is connected to an intake passage 114 that includes an intake throttle 120 to regulate the charge flow to cylinders 104. Intake passage 104 may also include a charge air cooler (not shown) to cool the charge flow provided to intake manifold 106. Intake passage 114 may also include an optional compressor (not shown) to compress the intake air flow received from an intake air cleaner (not shown.)

The EGR flow 108 may combine with the intake flow 118 at an outlet of EGR passage 110, at a mixer, or by any other arrangement. In certain embodiments, the EGR flow 108 returns to the intake manifold 106 directly. In the illustrated embodiment, EGR flow 108 mixes with the intake flow 118 downstream of throttle 120 so that exhaust pressure on cylinders 104 is closely aligned with intake pressure, which reduces pumping losses through cylinders 104. In other embodiments, EGR passage 110 can include an EGR cooler (not shown) and a bypass (not shown) with a valve 122 that selectively allows EGR flow to bypass the EGR cooler.

Exhaust passage 132 includes an aftertreatment system 138 that is configured to treat emissions in the exhaust gas. In one embodiment, aftertreatment system 138 includes a catalyst, such as a selective catalytic reduction catalyst or a three-way catalyst. Aftertreatment system 138 may also include a particulate filter, an oxidation catalyst, and/or other suitable aftertreatment component. Other embodiments contemplate an exhaust throttle (not shown) in the exhaust passage 132.

System 100 further includes a fuel system 150 that is operable to provide fuel from a fuel storage source 152, such as a fuel tank, to cylinders 104. The fuel storage source 152 includes, for example, an onboard fuel pump 154 which delivers fuel from the source 152 via a conduit 156 through a filter (not shown) to a common supply rail 160. The common rail 160 feeds fuel via respective fuel lines to a plurality of fuel injectors 162, at least one per cylinder, and in this example, four injectors 162. The fuel pump 154 is operated through a relay or other suitable connection to controller 140. It should be understood that any suitable fuel system is contemplated.

A direct injector, as utilized herein, includes any fuel injection device that injects fuel directly into the cylinder volume, and is capable of delivering fuel into the cylinder volume when the intake valve(s) and exhaust valve(s) are closed. The direct injector 162 may be structured to inject fuel at the top of the cylinder. In certain embodiments, the direct injector 162 may be structured to inject fuel into a combustion pre-chamber. Each cylinder 104 may include one or more direct injectors 162. The direct injectors 162 may be the primary or the only fueling device for the cylinders 104, or alternatively the direct injectors may be an auxiliary or secondary fueling device for the cylinders 104. In certain embodiments, the direct injectors 162 are capable of providing the entire designed fueling amount for the cylinders 104 at any operating condition. Alternatively, the direct injectors 162 may be only partially capable, for example the direct injectors 162 may be capable of providing a designated amount of fuel for a specific purpose.

In still other embodiments, cylinders 104 include a port injector (not shown) in addition to or alternatively to direct injectors 162. In these embodiments, the intake manifold 106 may be divided, or the port fuel injectors may be positioned such that no other cylinder 104 in the system 100 is downstream of the port fuel injector, i.e. only the target cylinder is downstream of the respective port fuel injector.

The fuel supply to the combustion chamber of each cylinder 104 is controlled by a fuel control module 142 that is a separate controller or a part of controller 140. Fuel control module 142 operates the injectors 162 according to a fuel command produced by controller 140 in response to engine operating conditions and/or route conditions. The controller 140 is connected to the fuel pump 154 and to a plurality of other engine condition sensors shown schematically as sensor 170. The engine condition sensors 170 may include, but are not limited to, sensors which monitor engine position, engine speed, manifold static pressure, mass air flow into the manifold, engine temperature, air temperature, cam shaft position (inlet and exhaust), inlet manifold tuning valves, barometric pressure, EGR amount, VGT position, torque demand, gear position, etc. Vehicle load data and/or aftertreatment component temperature data may also be provided by sensor 170, such as catalyst inlet/out temperature, particulate filter inlet/outlet temperature, etc.

Figure 3:
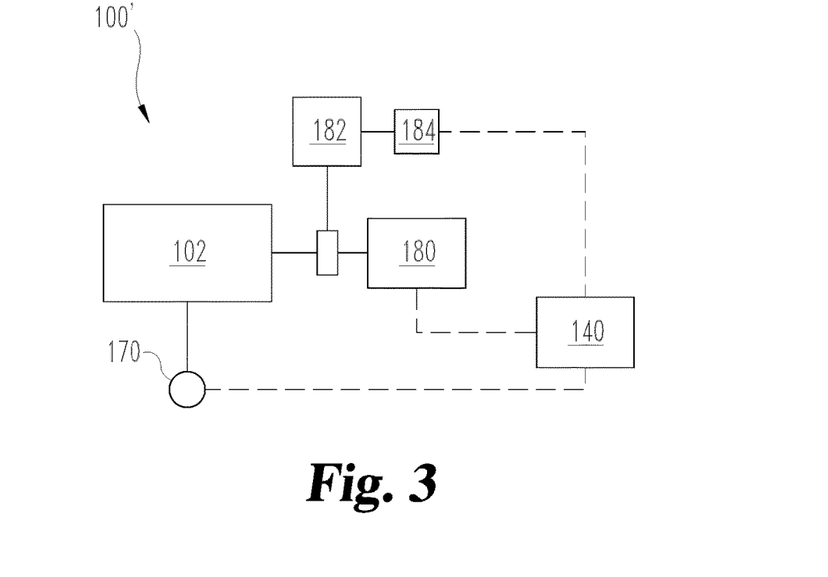
FIG. 3 is a schematic depiction of another embodiment system having an internal combustion engine operable in a cylinder deactivation mode of operation and further having additional reserve torque components such as an electric motor and/or transmission.

FIG. 3 shows another embodiment vehicle system 100' that includes engine 102 connected with a transmission 180 having a number of gears. System 100' also includes an electric motor/generator, hereinafter referred to as electric motor 182, and an energy storage device 184 such as a battery that can provide power to electric motor 182. Depending on the operating conditions, engine 102, transmission 180, and/or electric motor 182 include a torque reserve that can provide a torque assist to engine 102 to propel the vehicle and maintain a minimum vehicle speed. For example, if available a lower gear selection in transmission 180 can provide reserve torque. In addition or alternatively, a state-of-charge (SOC) of energy storage device 184 can be indicative of a torque reserve for electric motor 182. As discussed further below, the route conditions and/or torque reserve can be employed to initiate early cylinder deactivation operation and/or delay exit from an existing cylinder deactivation operation.

In certain embodiments, the system 100 includes a controller 140 structured to perform certain operations to control operations of engine 102. In certain embodiments, the controller 140 forms a portion of a processing subsystem including one or more computing devices having memory, processing, and communication hardware. The controller 140 may be a single device or a distributed device, and the functions of the controller 140 may be performed by hardware or software. The controller 140 may be included within, partially included within, or completely separated from an engine controller (not shown).

The controller 140 is in communication with any sensor or actuator throughout the system 100 such as sensors 170, including through direct communication, communication over a datalink, and/or through communication with other controllers or portions of the processing subsystem that provide sensor and/or actuator information to the controller 140. Controller 140 may also be in communication with a route data source 172 to provide data indicative of one or more present or upcoming route conditions of the vehicle.

In one embodiment, route data source 172 may provide to controller 140 route conditions including knowledge of the surrounding vehicles, horizon data (both static and changing), telematics information, operator information, sensor data, etc. to determine the best strategy for cylinder deactivation operation. For example, an intelligent transportation system (ITS) or similar system can provide look ahead route, grade, traffic, road construction, accidents, funeral processions, rush hour, source data from applications such as GOOGLE maps or WAZE, and other information. An ITS generally refers to the integration of information and communication technologies with transport infrastructure to improve economic performance, safety, mobility and environmental sustainability. An ITS may include real-time traffic information systems that collect data on traffic conditions, aggregate and translate the data, and disseminate the traffic data through various technologies.

Route data source 172 may also include dynamic route grade profiling through vehicle-to-vehicle (V2V) communications, where grade information from preceding vehicles is provided to the controller 140. Similarly, vehicles in the proximity of the route may provide speed and gear state information indicative of traffic volume, actual traffic speeds, and other dynamic route condition information. Vehicle-to-X (V2X) information, where X denotes a variety of possible types of external networks, may also be provided by route data source 172, such as traffic signal information. Route data source 172 may also include static maps and/or include information such as stop sign locations, stop light locations, roundabout locations, school zone locations, construction zones, and narrow lane locations, for example. Route condition information may also be considered such as environmental conditions that may affect traction (ice, snow, rain, etc.), potholes, road closures, and other obstacles that may require a vehicle to slow. Route condition information may also include environmental aspects such as headwind, tailwind, and/or ambient temperature data. For example, the CDA mode of operation may be delayed or not initiated due to increased aerodynamic load from a headwind. Alternatively, the CDA mode of operation may be initiated due to a reduced aerodynamic load from a tailwind. Ambient temperature may prevent or enable a CDA mode of operation by influencing the aftertreatment system temperatures by way of higher/lower intake air temperatures.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller 140 may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Certain systems are described following, and include examples of controller operations in various contexts of the present disclosure. In certain embodiments, the controller 140 interprets or determines a cylinder deactivation condition in response to one or more route conditions, and in response to the cylinder deactivation condition, the controller 140 provides a cylinder deactivation command that cuts fueling to one or more of deactivation cylinders 104b. In certain embodiments, the controller 140 switches operation of their respective intake valves 206 and exhaust valves 208 to a cam lobe having a zero lift profile or otherwise disables intake and/or exhaust valve opening.

The fuel injectors 162 may inject the fuel supply directly into each respective cylinder 104 or may supply fuel to the inlet valve ports, the injection timing being controlled the controller 140. During cylinder deactivation the supply of fuel to the deactivation cylinders 104b is cut off by individually disabling the respective fuel injectors 162 with the disablement being controlled by the controller 140 with a fueling command which disables the fuel injection to one or more of the deactivation cylinders 104b while the nominal cylinders 104a fire normally, or are compensated with additional fuel and air flow to meet power demands.

The operation of the engine 102 is controlled by the controller 140 in response to route conditions provided by route data source 172 and/or vehicle operating conditions sensed by one or more sensors represented by sensor(s) 170. Controller 140 is connected to the fuel injectors 162, either indirectly as shown through fuel control module 142, or directly, to control the injector operation. The controller 140 can determine the injection timing and the injection period or pulse width. Under normal or nominal engine operating conditions, fuel is provided to all cylinders 104. Under a cylinder deactivation condition, fuel in only provided to cylinders 104a and cut off from deactivation cylinders 104b.

Figure 4:
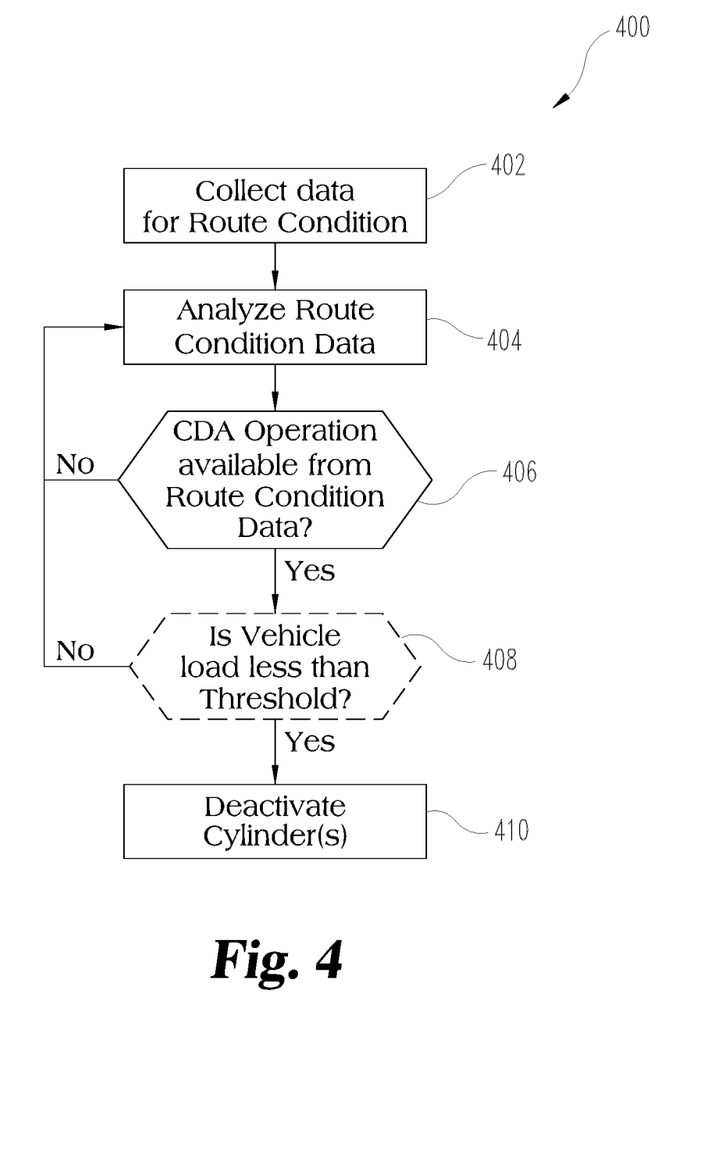
FIG. 4 is a flow diagram of one embodiment control method and apparatus for cylinder deactivation operation.

Referring to FIG. 4, there is shown a flow diagram of a procedure 400 for deactivating one or more of the cylinders 104 of engine 102 such as through operation of controller 140. Procedure 400 includes an operation 402 to collect data regarding one or more route conditions. As discussed above, the data can be collected from route data source 172, such as an ITS, V2V or V2X communications, static maps, sensor data from vehicle and/or another vehicle. The route condition data may include information about any one or more of real-time traffic conditions, accidents, road construction, construction zones, anticipation of construction zones, funeral processions, rush hour, route grade profiling and grade information, speed and gear state information indicative of traffic volume, actual traffic speeds, traffic signal information, stop sign locations, stop light locations, roundabout locations, school zone locations, narrow lane locations, traction and/or environmental conditions (ice, snow, rain), potholes, road closures, and any other obstacles that may require a vehicle to slow.

Procedure 400 continues at operation 404 to analyze the route condition data to, for example, identify whether a CDA condition is available or present, such as at locations and/or at a timing in which the route condition data indicates a vehicle speed at or below a threshold vehicle speed is required or desired. If conditional 406 is YES and the route condition data indicates a cylinder deactivation mode of operation is available, procedure 400 may continue at operation 410 to deactivate one or more cylinders 104. The CDA operation in response to the route condition data indicating a slower vehicle speed is required or desired allows for the aftertreatment temperature of aftertreatment system 138 to increase, to be maintained, or for the rate of temperature decrease to be reduced. Operation with the cylinders deactivated can continue until a driver request for more power is received, temperature limits are reached, or other CDA exit condition is satisfied.

If conditional 406 is NO, procedure 400 returns to operation 404 to continue to analyze route condition data. Procedure 400 may also include an optional conditional 408 to determine of the vehicle load is below a threshold load since it may be desirable to prevent cylinder deactivation in certain traffic or route condition situations in which the vehicle is more heavily loaded. If the vehicle load is greater than a threshold at conditional 408, procedure 400 can return to operation 404 to analyze route condition data. If the vehicle is more lightly loaded, such as after delivery or toward the end of the shift, then CDA operation can be enabled in response to the route condition data indicating a CDA condition is present.

Figure 5:
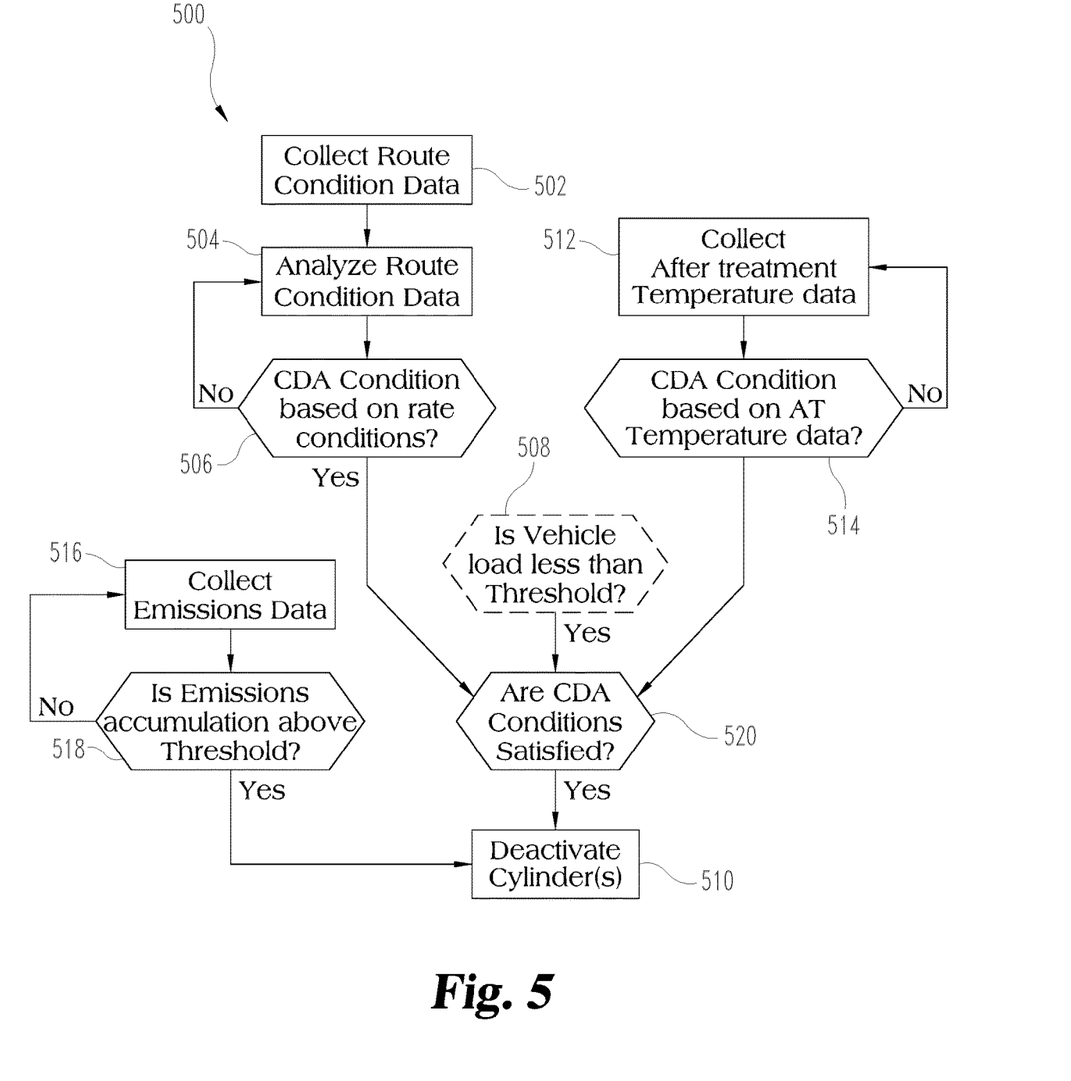
FIG. 5 is a flow diagram of another embodiment control method and apparatus for cylinder deactivation operation.

Referring to FIG. 5, another embodiment procedure 500 is shown that is similar to procedure 400, and includes a similar operation 502 to collect route condition data, operation 504 to analyze the route condition data, a conditional 506 to determine if a CDA condition is present based on the analysis of the route condition data, an optional conditional 508 regarding the vehicle load, and an operation 510 to deactivate one or more of the cylinders 104 in response to the route conditions indicating a CDA condition is present. However, procedure 500 also includes an operation 512 to collect aftertreatment temperature data and a conditional 514 to determine if a CDA condition is present based on the aftertreatment temperature data independently of the route condition data. For example, if the current aftertreatment temperature, or a predictive aftertreatment temperature, is less than a threshold value, then a CDA condition can be indicated to increase, maintain, or limit the rate of decrease of the aftertreatment temperature. If one of the conditionals 506 or 514 (and optional conditional 508 if provided) is satisfied at conditional 520, then a CDA condition is present and one or more cylinders 104 of the engine 102 can be deactivated.

Procedure 500 also includes an operation 516 to collect emissions data and a conditional 518 to determine if the accumulated emissions is above a threshold. If conditional 518 is YES, procedure 500 continues at operation 510 to deactivate one or more cylinders 104. If conditional 518 is NO, procedure 500 returns to operation 516 to continue to collect emissions data.

Figure 6:
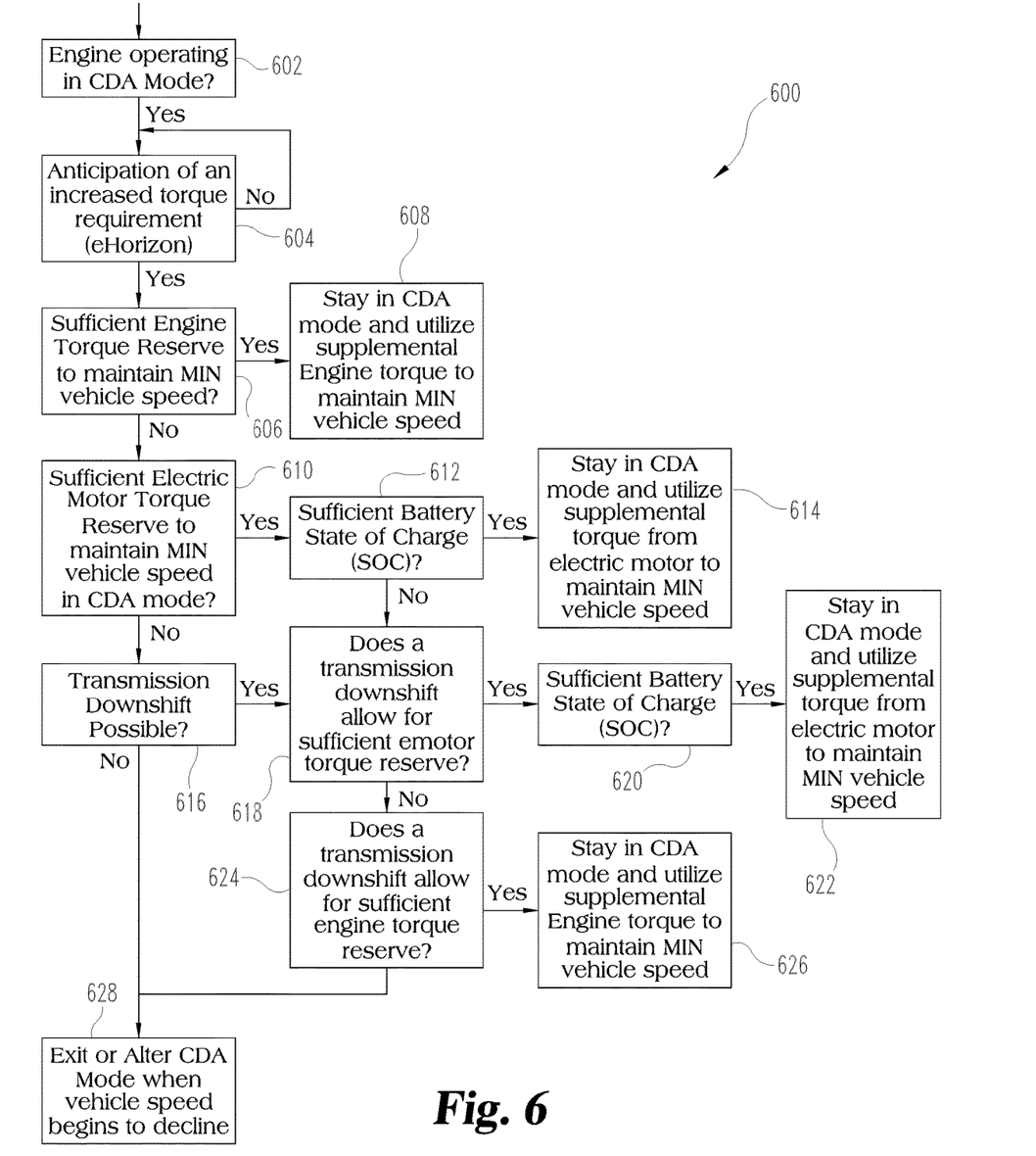
FIG. 6 is a flow diagram of another embodiment control method and apparatus for cylinder deactivation operation.

Another embodiment procedure 600 is shown in FIG. 6 in which CDA operation is controlled in response to an anticipated or upcoming uphill or inclined road segment while the vehicle is currently in a CDA mode of operation. Procedure 600 starts at operation 602 to determine if the CDA mode of operation is presently active. If active, the procedure 600 continues at operation 604 to determine if an increased torque requirement is present, such as an uphill or inclined segment of the route. Any suitable technique for determining the increased torque requirement is contemplated, including route condition data from an ITS, V2V or V2X communications, GPS, static maps, etc.

In response to an increased torque requirement being present, procedure 600 continues at operation 606 to determine if sufficient engine torque reserve from engine 102 is available to maintain a minimum vehicle speed to traverse the uphill segment while in the CDA mode of operation. If sufficient torque reserve is present, procedure 600 continues at operation 608 to remain in the CDA mode of operation by utilizing the engine torque reserve to maintain the minimum vehicle speed. In one embodiment, the engine torque reserve can be determine as a function of the gross vehicle weight and engine specifications, such as torque and horsepower.

In response to the engine torque reserve being insufficient to maintain a minimum vehicle speed, procedure 600 continues at operation 610 to determine if sufficient electric motor torque reserve is available from motor 182 to maintain a minimum vehicle speed to traverse the uphill segment while in the CDA mode of operation. It is also contemplated that the electric motor torque reserve can alternatively or additionally be used during cylinder deactivation for the purposes of engine/powertrain noise attenuation, engine/powertrain vibration attenuation, and/or providing supplemental torque to the drivetrain that would serve to expand the window of cylinder deactivation operation. If sufficient torque reserve is present in motor 182, procedure 600 continues at operation 612 to determine if energy storage device 184 has sufficient capacity, such as a state-of-charge (SOC), to power motor 182 to supply the torque reserve to maintain the minimum vehicle speed. If so, procedure 600 continues at operation 614 to remain in the CDA mode of operation by utilizing the motor torque reserve to maintain the minimum vehicle speed.

In response to the motor engine torque reserve being insufficient to maintain a minimum vehicle speed, procedure 600 continues at operation 616 to determine if a transmission downshift is possible with transmission 180. If a transmission downshift is possible, procedure 600 continues at operation 618 to determine if the transmission downshift allows for sufficient motor torque reserve. If there is sufficient electric motor torque reserve available from motor 182 at operation 618 to maintain a minimum vehicle speed to traverse the uphill segment while in the CDA mode, procedure 600 continues at operation 620 to determine of energy storage device 184 has sufficient capacity to power the motor 182. If so, procedure 600 continues at operation 622 to remain in the CDA mode of operation by utilizing the transmission downshift and motor torque reserve to maintain the minimum vehicle speed.

If at operation 618 the transmission downshift does not allow for sufficient torque reserve from motor 182, procedure 600 continues at operation 624 to determine if the transmission downshift allows for sufficient engine torque reserve to maintain the minimum vehicle speed. If so, procedure 600 continues at operation 626 to remain in the CDA mode of operation by utilizing the transmission downshift and the engine torque reserve to maintain the minimum vehicle speed. If there is not sufficient engine torque reserve at operation 624, or if a transmission downshift is not possible at operation 616, procedure 600 continues at operation 628 to exit or alter the CDA mode of operation. It should be understood that altering the CDA mode of operation may including transitioning to a reduced level of CDA, such transitioning from three active cylinders to two active cylinders, while staying in a CDA mode of operation.

Figure 7:
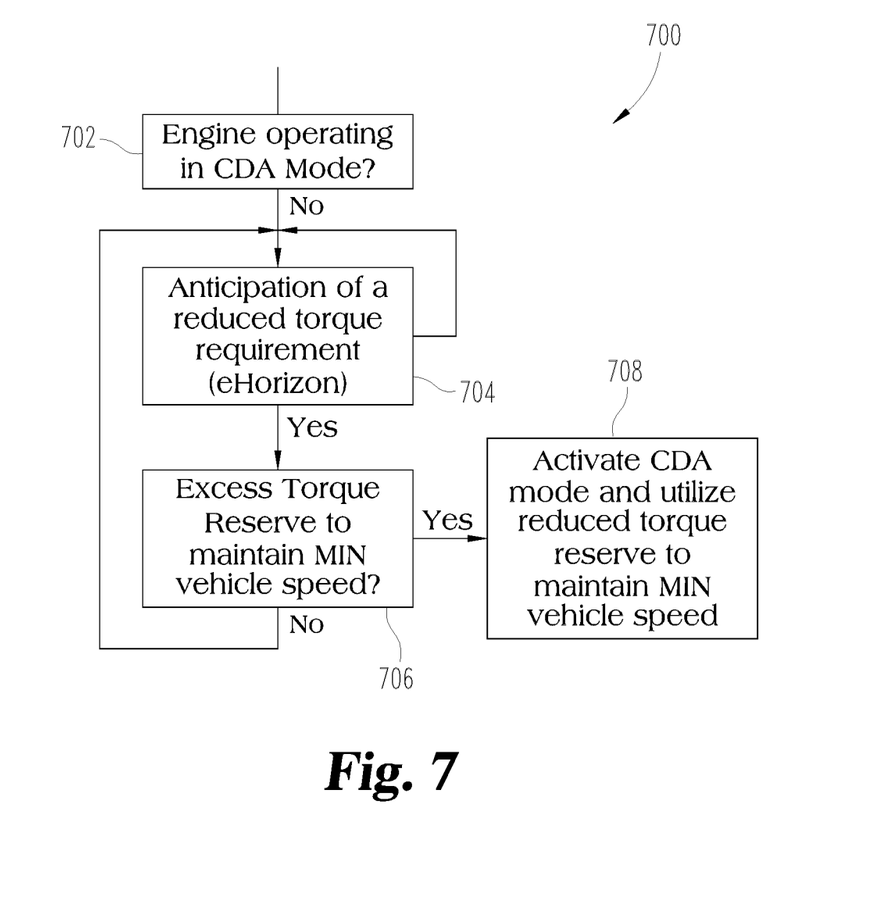
FIG. 7 is a flow diagram of another embodiment control method and apparatus for cylinder deactivation operation.

Another embodiment procedure 700 is shown in FIG. 7 in which CDA operation is controlled in response to anticipation of a downhill or declined road segment while the vehicle is currently not in a CDA mode of operation. Procedure 700 starts at 702 to determine if the CDA mode of operation is presently active. If the CDA mode of operation is not active, procedure 700 continues at operation 704 to determine if there is an anticipation of a reduced torque requirement, such as due to a downhill segment of the route. Any suitable technique for determining the decreased torque requirement is contemplated, including route condition data from an ITS, V2V or V2X communications, GPS, static maps, etc.

In response to a decreased torque requirement being present, procedure 700 continues at operation 706 to determine if sufficient torque reserve of the vehicle is available to maintain a minimum vehicle speed to travel to and/or traverse the downhill segment while in the CDA mode. If sufficient torque reserve is present, procedure 700 continues at operation 708 to activate the CDA mode of operation by utilizing the torque reserve to maintain the minimum vehicle speed to the downhill segment. In one embodiment, the engine torque reserve can be determine as a function of the gross vehicle weight and engine specifications, such as torque and horsepower.

Another aspect includes a system and/or method for propelling a vehicle having a powertrain including an internal combustion engine with a plurality of cylinders, an intake system for providing a charge flow to the plurality of cylinders, a fuel system for providing fuel to the plurality of cylinders, and an electric motor/generator configured to provide a torque reserve. The system and method also includes a controller configured to determine a cylinder deactivation condition in response to one or more route conditions associated with operation of the vehicle, and in response to the cylinder deactivation condition being present, the controller is configured to deactivate one or more of the plurality of cylinders and utilize the torque reserve from the electric motor/generator for operation during cylinder deactivation.

In one embodiment, the controller or the method determines the torque reserve available during cylinder deactivation, and utilizes the torque reserve for at least one of: maintaining a minimum speed of the vehicle, attenuating noise of the powertrain, attenuating vibration of the powertrain, and providing supplemental torque the powertrain to extend a duration of cylinder deactivation operation.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system for propelling a vehicle, comprising:
   an internal combustion engine having a plurality of cylinders, an intake system for providing a charge flow to the plurality of cylinders, and a fuel system for providing fuel to the plurality of cylinders; and
   a controller configured to collect data regarding one or more route conditions associated with traffic conditions during operation of the vehicle along a route and determine a cylinder deactivation condition in response to the one or more traffic conditions and a load on the vehicle along the route, and in response to the load on the vehicle being lighter due to deliveries along the route, the controller is configured to determine the cylinder deactivation condition is present and deactivate one or more of the plurality of cylinders.

2. The system of claim 1, wherein the one or more route conditions include traffic information from an intelligent transportation system.

3. The system of claim 1, wherein the one or more route conditions include a road condition.

4. The system of claim 1, wherein the one or more route conditions include a road layout.

5. The system of claim 1, wherein the one or more route conditions include vehicle-to-vehicle or vehicle-to-X communication of a route condition.

6. The system of claim 1, wherein the one or more route conditions that indicate a cylinder deactivation condition is present are associated with a speed requirement of the vehicle being less than a threshold speed.

7. The system of claim 1, wherein the controller is configured to determine the load on the vehicle is less than a threshold value in order to deactivate the one or more cylinders in response to the one or more route conditions.

8. The system of claim 1, wherein the controller is configured to determine a present or imminent temperature of an aftertreatment system is less than a temperature threshold in order to deactivate the one or more cylinders.

9. The system of claim 1, wherein the controller is configured to determine a torque reserve available to maintain a minimum speed of the vehicle and, in response to the one or more route conditions indicating an upcoming downhill segment of the route, to deactivate the one or more cylinders and utilize the torque reserve to maintain the vehicle at or above the minimum speed to the upcoming downhill segment.

10. The system of claim 1, wherein the controller is configured to determine a torque reserve available to maintain a minimum speed of the vehicle and, in response the one or more route conditions indicating an upcoming uphill segment of the route, to utilize the torque reserve to extend the deactivation of the one or more of the plurality of cylinders and maintain the vehicle at or above the minimum speed along the uphill segment.

11. The system of claim 10, wherein the torque reserve includes an engine torque reserve of the internal combustion engine and an electric motor torque reserve of an electric motor.

12. The system of claim 11, wherein determining the electric motor torque reserve further includes determining a state-of-charge of a battery operable to store energy for operation of the electric motor.

13. The system of claim 11, wherein the controller is configured to determine the torque reserve available in response to a downshift of a transmission connected to the internal combustion engine.

14. A method comprising:
    providing a charge flow to an internal combustion engine having a plurality of cylinders connected to an exhaust passage while operating a vehicle;
    determining one or more route conditions associated with traffic conditions of a route along which the vehicle is operated and a load on the vehicle along the route; and
    in response to the traffic conditions and the load on the vehicle being lighter due to deliveries along the route determining a cylinder deactivation condition is present and deactivating at least one of the plurality of cylinders.

15. The method of claim 14, wherein the one or more route conditions are determined based on data from at least one of: traffic information from an intelligent transportation system, a road condition, a road layout, traffic signal information, and a route grade.

16. The method of claim 14, wherein the one or more route conditions that indicate a cylinder deactivation condition is present are associated with a speed requirement of the vehicle being less than a threshold speed.

17. The method of claim 14, further comprising determining the load on the vehicle is less than a threshold value in order to deactivate the one or more cylinders in response to the one or more route conditions.

18. The method of claim 14, further comprising determining a torque reserve is available to maintain a minimum speed of the vehicle and, in response the one or more route conditions indicating an uphill segment of the route, maintaining deactivation of the one or more cylinders and utilizing the torque reserve to maintain the vehicle at or above the minimum speed along the uphill segment.

19. The method of claim 14, further comprising determining a torque reserve is available to maintain a minimum speed of the vehicle and, in response the one or more route conditions indicating a downhill segment of the route, deactivating the one or more cylinders and utilizing the torque reserve to maintain the vehicle at or above the minimum speed to the downhill segment.

20. The method of claim 14, further comprising collecting emissions data and, in response to accumulated emissions being above a threshold, deactivating at least one of the plurality of cylinders.

21. A system for propelling a vehicle, comprising:
a powertrain including an internal combustion engine having a plurality of cylinders, an intake system for providing a charge flow to the plurality of cylinders, and a fuel system for providing fuel to the plurality of cylinders;
an electric motor/generator configured to provide a torque reserve; and
a controller configured to determine a cylinder deactivation condition in response to one or more route conditions associated with operation of the vehicle, and in response to the cylinder deactivation condition being present, the controller is configured to deactivate one or more of the plurality of cylinders and utilize the torque reserve from the electric motor/generator to maintain a minimum speed for operation of the vehicle to traverse a route segment during cylinder deactivation, wherein the controller is configured to determine a gross weight of the vehicle in utilizing the torque reserve.

22. The system of claim 21, wherein the controller is configured to determine the torque reserve available during cylinder deactivation, and to utilize the torque reserve for at least one of: maintaining the minimum speed of the vehicle, attenuating noise of the powertrain, attenuating vibration of the powertrain, and providing supplemental torque the powertrain to extend a duration of cylinder deactivation operation.

* * * * *